Dec. 24, 1946.  A. S. FEINBERG  2,413,138
WATER CONTROL FOR EVAPORATIVE COOLERS
Filed Oct. 20, 1944
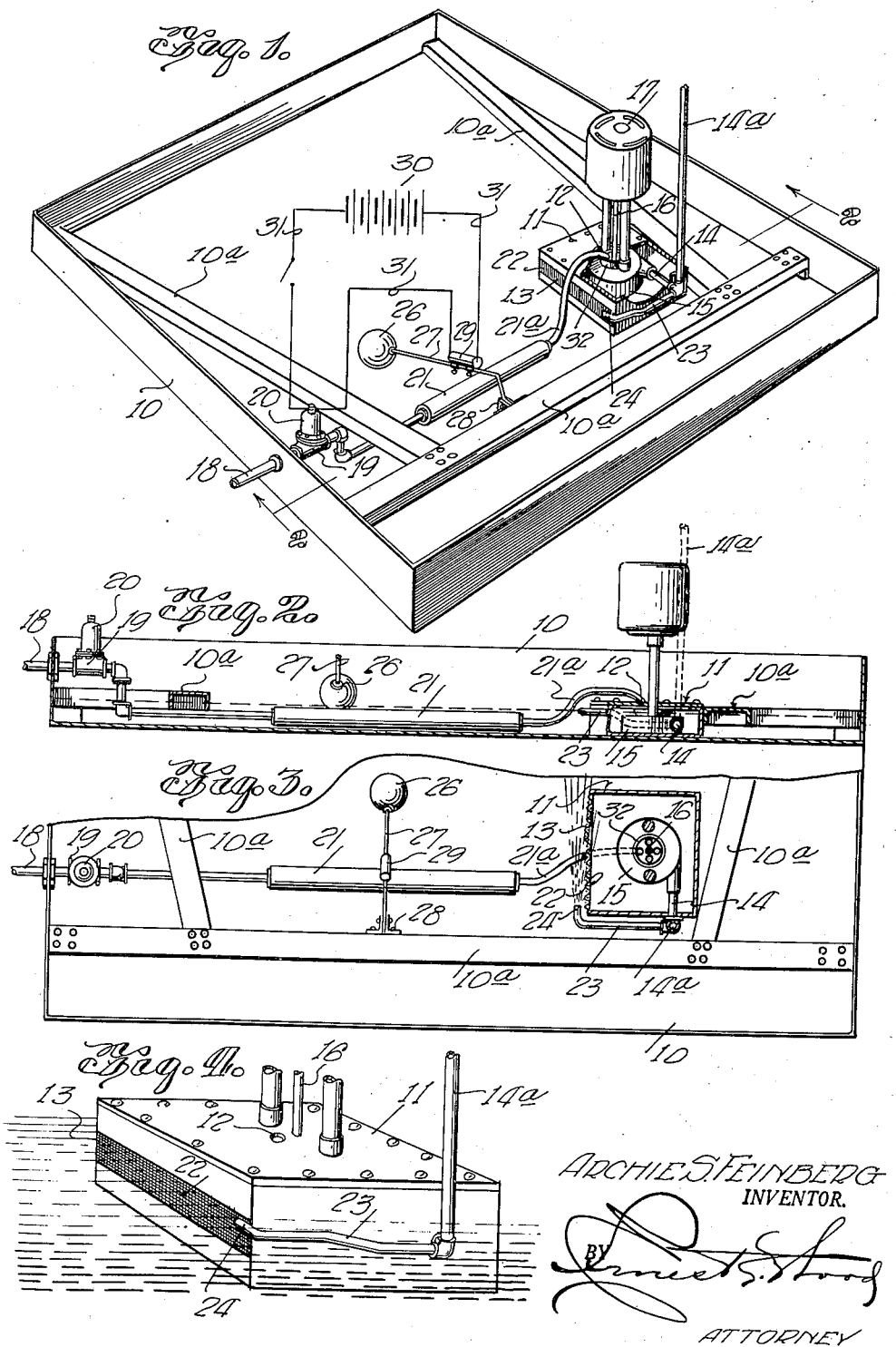
ARCHIE S. FEINBERG
INVENTOR.
BY
ATTORNEY Patented Dec. 24, 1946

2,413,138

UNITED STATES PATENT OFFICE 2,413,138

WATER CONTROL FOR EVAPORATIVE COOLERS

Archie S. Feinberg, Dallas, Tex.

Application October 20, 1944, Serial No. 559,533

1 Claim. (Cl. 261—34)

This invention relates to evaporative air cooling equipment and more particularly to improvements in make-up water supply for evaporative coolers.

The conventional method of supplying make-up water to an evaporative cooler employs a common float controlled valve which admits water required to replace that used in the vaporization process taking place in the wetted fibrous pads or mats of the cooler.

The water float with which conventional coolers are equipped is unsatisfactory in many respects. One serious disadvantage lies in the fact that the body of water in the reservoir being relatively shallow, rarely over three or four inches in depth, float displacement and consequent valve movement is limited to such extent as to cause frequent sticking of the needle valve. This results in either a continuous overflow or an empty water pan and in the latter case, cessation of cooling. It is rare that the valve during operation of the cooler, ever opens up fully and the rate of evaporation for the most part causes only a limited travel of the valve needle and permits not much more than seepage in the flow of water.

The principal object of the present invention is to provide an improved water supply system for evaporative coolers which will insure an adequate supply of water in the reservoir at all times by providing for positive and complete opening and closing of the inlet valve. Also, by virtue of a sealed chamber in the reservoir into which uncontaminated municipal water is primarily directed preparatory to initial saturation of the filter pads, the latter are kept relatively free of foreign matter such as microscopic animal and vegetable organisms, algae and the like, which give rise to obnoxious odors, sometimes referred to as "souring." These odors, combined with the fact that an unhealthful condition is created by the accumulated filth through which the air is required to be drawn, have always represented a serious defect in evaporative coolers in general.

Another object of the invention is to provide a water supply system for evaporative coolers which, combined with the aforesaid provision for supplying fresh water to the filter mats and the periodic flushing resulting therefrom, is equipped with an arrangement for filtering water drawn from the reservoir by a pump. Moreover, provision is also made for continuously flushing the intake area of said sealed chamber in the vicinity of the filter, to prevent infiltration of foreign matter in suspension on the surface of the reservoir water and to thereby maintain relatively clean condition of the chamber water serving the pump therein.

Still another object of the invention is to provide for precooling the tap water of ordinarily high temperature before aeration by passing the same through a cooling conduit, constructed of a material of rapid heat conductivity, submerged in the re-aerated water of the reservoir, whose lower temperatures will have the effect to equalize the temperatures, approaching that which obtains in the reservoir.

With the foregoing objects as paramount, the invention has further reference to certain features of accomplishment which will become apparent as the description proceeds, taken in connection with the accompanying drawing wherein:

Figure 1 is a perspective view of a typical water pan or reservoir of a conventional evaporative cooler; showing the invention installed therein.

Figure 2 is an elevational view with one end or side removed from the pan, taken on line 2—2 on Figure 1.

Figure 3 is a fragmentary plan view, and

Figure 4 is a detail perspective view of the pump chamber.

Continuing with a more detailed description of the drawing, reference numeral 10 denotes the conventional pan or water reservoir of an evaporative cooling unit which contains the supply of water elevated by a pump for precipitation through one or more mats or pads (not shown) composed of excelsior or wood fibers, and supported upon skids 10a.

Mounted within the reservoir 10 is a casing or chamber 11, sealed except for an inlet 12 for fresh water, an inlet 13 for reservoir water and a pump outlet 14, to which further reference will be made presently. Arranged in the casing or chamber 11 is a conventional water pump 15, whose operating shaft 16 extends upwardly and is operated by a small electric motor 17.

Municipal or tap water is introduced through pipe 18 at one side of the pan 10 and its movement is controlled by a valve 19, actuated by a solenoid 20, to be later described. Continuing through pipe 18, the water enters a conduit or heat exchanger 21 of larger diameter than pipe 18 and constructed preferably of a material such as relatively thin copper, aluminum or other material known to possess high heat conductivity. This conduit is submerged in the water of the revervoir 10 and consequently the tap water, when flowing therethrough, which is usually about 85° is influenced to lower temperatures by the comparatively cool, pre-aerated water of the basin or pan 10, which latter is of a temperature more nearly that of the atmospheric wet bulb temperature of the moment, usually in the middle seventies. The heat exchanger conduit 21 is in communication with the inlet 12 of the chamber 11, through pipe 21a. The inlet 13 in one side of the pump chamber 11 is in the form of an elongated opening, over which is arranged a filter 22 of finely woven wire mesh, submerged or partly submerged in the water of the basin 10. This filter will be again referred to presently. The pump outlet or pipe 14 supplies the spray or sprays (not shown) through pipe 14a which serve to moisten the filter mats. This pipe is tapped and a lateral 23 extends therefrom, around the corner of the chamber 11 and is formed into a nozzle or skimmer 24 (Figure 4), which directs a stream of water across in front of and parallel to the screen filter 13 in such manner as to continuously clear the surface of the water in the immediate vicinity of the opening 13 of accumulations of foreign matter likely otherwise to be entrained with the water drawn into the filter by pump suction through the reservoir intake 13. In this manner, even the reservoir water, after aeration, is not re-aerated without having been first subjected to such cleansing action as the filter will afford and at least the larger particles of foreign matter and much algae are constrained to remain in the reservoir, by virtue of the action of the skimmer or nozzle 24, and this matter will, for the most part, settle to the bottom of the pan 10 eventually, to be removed during periodic cleanings of the latter.

The level of water in the pan 10 is controlled through the medium of a float 26, suspended by an arm 27, which latter is pivoted by means of a bracket 28 mounted on the mat skid 10a extending transversely across the pan 10. The normal level of water in the pan is above the inlet 12, although the showing thereof in Figure 2 indicates the level as being below the said inlet, in which case, water is supplied to the pump inlet directly from supply pipe 18 through conduit 21 and pipe 21a.

Mounted on the float arm 27 is a mercury switch 29 which is adjustable and by virtue of such adjustability, the level of the water in the reservoir may be accurately predetermined. A circuit is established through a source 30, usually 110 V. house circuit, through wires 31, connecting the switch 29 and solenoid 20 together electrically, as shown in Figure 1, so that when the level of water in the pan 10 reaches a predetermined point, the switch 29 will function, through the action of the float 26 to energize the solenoid 20 and thereby closes the valve 19 against further inflow of tap water through pipe 18, heat exchanger 29 and pipe 21a.

It is to be noted that in order to positively insure against the introduction of any foreign matter with the fresh water into the pump chamber 11, the pipe 21a is directed through the port 12 of the chamber into a receptacle 32, disposed about the pump inlet, which latter is also served by the water entering the chamber through the filter 22.

It is apparent, in operation, that once the mats of the cooler have been saturated by fresh water from a service main through pipe 18, as described, and the water collected in the reservoir has risen to the desired level, the switch 29 will function to close the valve 19 in the manner explained. Until the level is lowered by process of vaporization, the valve 19 will not be again opened to admit tap water and the pump 15 will supply the mats with reservoir water through pipe 14a but only water from which has been extracted the foreign matter usually giving trouble in conventional equipment, because the skimmer 24 is always in operation during operative periods of the pump to discourage ingress of such matter into the pump chamber 11, even particles small enough to pass through the interstices of the filter, so long as they are in suspension.

It is therefore apparent that insects, algae, feathers, bits of decayed matter and the like flushed out of the filter mats into the reservoir, which otherwise would be picked up and redeposited in the mats are kept from being thus recirculated by the provisions herein recited and are constrained thereby to remain in the reservoir until they are dispensed with when the latter is cleaned and scoured in the conventional manner. Hence, the mats are kept in a more sanitary condition for longer periods of time to insure a more healthful condition of the air serviced by the apparatus, as well as obviating obnoxious odors resulting from the souring of the material collecting on the mats.

Manifestly, the construction as shown and described is capable of some modification and such modification as may be construed to fall within the scope and meaning of the appended claim is also considered to be within the spirit and intent of the invention.

What is claimed is:

In a water control for evaporative cooling apparatus having fibrous filter mats the combination comprising, a make-up reservoir, a chamber in said reservoir closed except for a screened inlet in a vertical wall thereof, partially submerged in the water of said reservoir, a pump in said chamber whose discharge serves said mats, means for periodically introducing fresh water into the intake of said pump, means for by-passing a part of said pump discharge across said chamber inlet to divert foreign floating surface matter influenced by pump suction to prevent said foreign matter from being carried to said mats by said pump and means for electrically predetermining the water level of said reservoir.

ARCHIE S. FEINBERG.